United States Patent

Zelina

[15] 3,652,958

[45] Mar. 28, 1972

[54] LOAD FILTER NETWORK

[72] Inventor: William B. Zelina, Edinboro, Pa.

[73] Assignee: General Systems, Inc., Erie, Pa.

[22] Filed: Apr. 23, 1969

[21] Appl. No.: 818,538

[52] U.S. Cl. ....................................333/79, 321/2, 321/10, 307/104, 307/270

[51] Int. Cl. .......................................................H03h 7/14

[58] Field of Search ......................333/70, 79; 321/2, 10, 2.5

[56] References Cited

UNITED STATES PATENTS

| | | | |
|---|---|---|---|
| 1,784,004 | 12/1930 | Geiger et al. | 333/79 |
| 1,852,125 | 5/1932 | Meissner | 333/79 |
| 1,897,249 | 2/1933 | Fleming | 333/79 |
| 1,849,477 | 5/1932 | Brown | 333/79 |
| 2,710,938 | 6/1955 | Lee | 321/25 |
| 3,090,017 | 5/1963 | Novic | 333/79 |
| 3,372,285 | 3/1968 | Blazek | 321/10 |
| 3,335,355 | 8/1967 | Beck | 321/10 |
| 3,331,008 | 7/1967 | Bedford | 307/109 |
| 3,270,269 | 8/1966 | Low | 321/2 |
| 3,559,028 | 1/1971 | Studtman | 321/2 |

*Primary Examiner*—Herman Karl Saalbach
*Assistant Examiner*—C. Baraff
*Attorney*—Charles L. Lovercheck

[57] ABSTRACT

A new and improved filter circuit arrangement wherein the instantaneous current demand from an ON-OFF voltage source is kept below the current requirements of the load by storing energy in the magnetic circuit of the filter inductance during the ON-time of the source and recovering this stored energy and delivering it to the load during the OFF-time of the source and at a lower voltage and higher current level than that at which is was stored. To accomplish this a shunt rectifier device is connected with an intermediate tap of the filter inductance and is poled to block current flow from the source.

4 Claims, 3 Drawing Figures

INVENTOR.
WILLIAM B. ZELINA
BY Joseph V. Claeys
HIS ATTORNEY

LOAD FILTER NETWORK

This invention relates to filter circuits of the type placed between the output of an ON-OFF type voltage source and a load impedance for the purpose of making the current delivered to the load substantially pure direct current in spite of any alternating components contained in the voltage source applied to the filter input.

As the number of electronic systems employing semiconductor switching devices to deliver controlled power to a load continues to grow at an ever increasing rate, one problem confronting the design engineer is that of "commutating" the load current. When load currents are large this can become a critical problem.

The present invention overcomes this problem by arranging to keep the instantaneous current demand from the ON-OFF type voltage source below the current requirements of the load.

It is an object of this invention therefore to provide a new and improved filter circuit for connection between the output of an ON-OFF type voltage source and a load impedance which will keep the instantaneous current demand from the voltage source below the current requirements of the load.

A feature of this invention resides in the use of the energy stored in the series inductance of the filter section in a new and unique manner.

Briefly stated, in accordance with the embodiments of this invention disclosed herein, a filter circuit is provided which keeps the instantaneous current demand from an ON-OFF type voltage source below the current requirements of the load by arranging to store energy in the magnetic circuit of the inductance at one voltage value during the on time of the voltage source and to recover this stored energy and deliver it to the load at a lower voltage and higher current value during the OFF-time of the voltage source.

Figures 1, 2A:
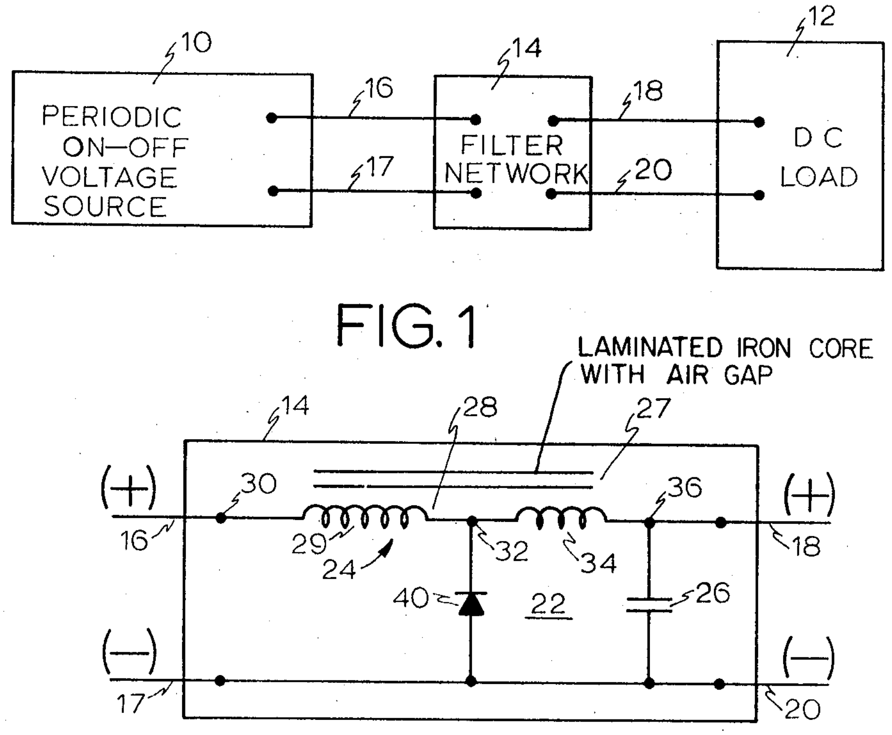
Figure 2B:
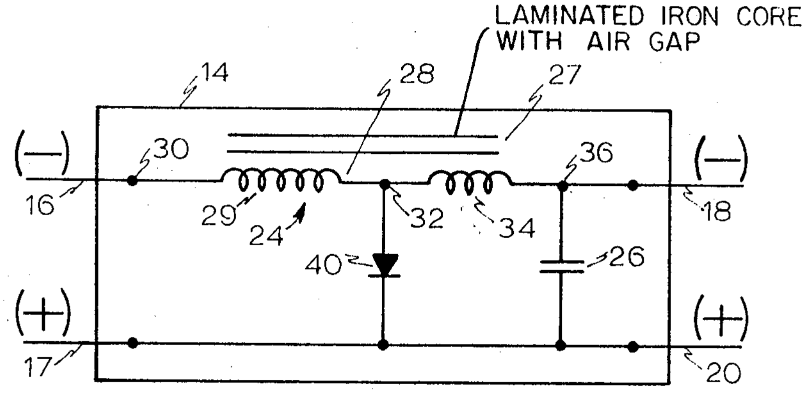

The novel features believed characteristic of the invention are set forth with particularity in the appended claims. The invention itself however both as to its organization and method of operation, as well as further objects and advantages thereof may best be understood by reference to the following description taken in conjunction with the accompanying drawing in which:

FIG. 1 is a diagrammatic representation showing the invention being utilized in a typical application, and FIGS. 2*a* and 2*b* disclose in schematic form specific embodiments of the invention.

Referring now to the drawing wherein like reference characters designate like or corresponding parts in the different views there is shown in FIG. 1 an ON-OFF type voltage source 10 which may be a rectifier, a "single ended" inverter, or other similar periodic voltage source. For example, voltage source 10 may be a single ended inverter (chopper) such as that disclosed in my copending U.S. Pat. application Ser. No. 690,692 filed Nov. 16, 1967 and assigned to the same assignee as the present invention.

Voltage source 10 is connected to supply power to a load or other utilization circuit 12 through the filter circuit 14 of this invention. Thus, as shown, the output of ON-OFF voltage source 10 is connected by conductors 16 and 17 with the input of filter network 14, the output of which is connected by conductors 18 and 20 with the DC load 12. The new and improved filter circuit 14 of this invention is inserted between the voltage source and the DC load not only to deliver substantially pure direct current to the load but also to keep the instantaneous current demand from the periodic ON-OFF voltage source 10 below the current requirements of the load.

FIG. 2*a* shows one embodiment of the invention 14 in schematic form for use in a circuit of the type shown in FIG. 1 when the respective polarities are as illustrated. That is, so that conventional current flow would be from the source 10 via conductors 16 and 18 to load 12 and via conductors 20 and 17 back to the source. FIG. 2*b* illustrates another embodiment where source 10 is required to provide a negative, rather than a positive, potential to load 12.

Referring now to FIGS. 2*a* and 2*b* the new and improved filter network comprises a filter section 22 including a series inductance 24 connected between conductors 16 and 18 and a shunt capacitance 26 connected across the output conductors 18 and 20. Filter section 22 is designed in accordance with the well known practical considerations, such as making the reactance of the shunt capacitance 26 at the lowest ripple frequency much smaller than the resistance of the load 12. (Or the reactance of the series inductance of the following section if more than one filter section is to be employed.) Also, the inductance 24 should have a laminated iron core, or magnetic circuit, with an air gap that is sufficient to prevent the DC magnetization from saturating the core.

In accordance with the illustrated embodiments of the invention, therefore, the series inductance 24 comprises a magnetic circuit 27 and a winding 28 magnetically coupled to the magnetic circuit. The winding 28 is made up of two series connected portions, a first portion 29 between a first end terminal 30 and an intermediate terminal 32 and a second portion 34 between the intermediate terminal 32 and the other end terminal 36. Winding 28 is so arranged that the first portion 29 contains more turns than does the second portion 34 thereof. For example, in a particular arrangement for use between a single ended inverter circuit and a DC load, the first portion 29 contained about 100 turns while the second portion 34 contained only about 40 turns.

A shunt rectifier 40, which may be a semiconductor diode device, is connected with the intermediate terminal 32 and is poled to allow current to be delivered to the load through both portions 29 and 34 of the winding of inductance 24 and to store energy in the magnetic circuit thereof during the ON-time of the voltage source 10 while providing for this stored energy to be recovered and delivered to the load through only the second (smaller number of turns) portion 34 of the winding of inductance 24 during the OFF-time of the voltage source 10. Accordingly, for the polarity illustrated in FIG. 2*a* the cathode of diode 40 is connected with the intermediate terminal 32 and the cathode thereof is connected in common to conductors 17 and 20. Similarly, for the polarity illustrated in FIG. 2*b* the anode of diode 40 is connnected with the intermediate terminal 32 and the cathode thereof is connected in common to conductor 17 and 20.

In operation, assume that FIG. 2*a* is utilized in block 14 of FIG. 1 and that the relative polarities are as illustrated such that source 10 supplies a positive direct current potential to load 12. Where convenient, for simplicity of description and ease of understanding the invention, assume that source 10 is a 'single-ended' inverter circuit (chopper) such as that disclosed in the foregoing referenced U.S. Pat. application Ser. No. 690,692 wherein a controlled rectifier device, such as an SCR, is turned on and off to control the power delivered to a load.

The present invention operates in the following manner to make the current delivered to the load from source 10 substantially pure direct current and also to keep the instantaneous current demand from the source 10 below the current requirements of the load.

During the ON-time of the voltage source 10 (controlled rectifier conducting) a pulse of voltage is applied to input conductors 16 and 17 and to the filter section 22. Accordingly, current will be delivered to load 12 through both portions 29 and 34 of the winding of series inductance 24. Inductance 24 opposes the flow of any alternating current components from source 10 and shunt capacitance 26 by-passes any alternating currents that succeed in flowing through the series inductance 24 so that during the ON-time substantially pure direct current is delivered to the load 12. Also, the current flowing through the winding causes energy to be stored in the magnetic circuit of the inductance.

During the OFF-time of source 10 (controlled rectifier nonconducting) the energy stored in the magnetic circuit during the ON-time will be recovered and delivered to the load via a series loop made up of the second portion 34 (the smaller turns portion) of the winding, the load 12 and the rectifier device 40.

The energy was stored in the magnetic circuit of series inductance 24 through a path including all turns of the winding whereas this stored energy was recovered and delivered to the load through a path including only a small portion of the turns. From the laws of magnetism, therefore, since both portions of the winding are on a common magnetic circuit, the volt-seconds stored in that magnetic circuit during the ON-time are equal to the volt-seconds recovered from that magnetic circuit during the OFF-time. Since less turns are utilized to recover this stored energy than were utilized to store that energy, it follows from the law of equal ampere-turns that the energy can be stored at a lower current (and higher voltage) value and recovered at a higher current (and lower voltage) value. Since the instantaneous current demand on the source 10 is during the ON-time, the invention makes it possible to keep this current demand below the current requirements of the load.

This may be more readily understood by reference to the following specific example wherein the series inductance 24 has a first portion 29 having 100 turns and a second portion 34 having 50 turns. From the law of equal ampere-turns the relationship between the current ($I_1$) during the ON-time and the current $I_2$ during the OFF-time may be expressed as follows:

$$I_1\,(N_{29}+N_{34}) = I_2\,(N_{34})$$

and $$I_2 = I_2\,[N_{34}/(N_{29}+N_{34})] \qquad (1)$$

$$I_2 = I_1\,[(N_{29}+N_{34})/N_{34}] \qquad (2)$$

where:

$N_{29}$ = Number of turns in winding portion 29

$N_{34}$ = Number of turns in winding portion 34

$I_1$ = Current delivered to load 12 during ON-time of source 10

$I_2$ = Current delivered to load 12 during OFF-time of source 10

Since in the particular example given the ratio $[N_{34}/(N_{29}+N_{34})] = 1/3$ and the $I_1 = I_{/2} = 3I$ ratio $[(N_{29}+N_{34})/N_{34}] = 3$, equations (1) and (2) become $$I_1 = I_2/3 \qquad (3)$$

$$I_2 = 3I_1 \qquad (4)$$

From the foregoing specific example, therefore, it is evident that during the ON-time of source 10 current will be delivered through inductance 24 to load 12 at a current value only one-third that at which the energy stored in the magnetic circuit of that inductance is delivered to load 12 during the OFF-time of the source. Accordingly, the instantaneous current demand from source 10 has been kept below the current requirement of the load.

While only certain specific preferred embodiments have been shown by way of illustration, many changes and modifications will occur to those skilled in the art. It is to be understood, therefore, that the appended claims are intended to cover all such changes and modifications as fall within the true spirit and scope of the invention.

What I claim and desire to secure by Letters Patent of the United States is:

1. A four-terminal network comprising:
   a. Input means adapted to be connected with an ON-OFF type voltage source of the chopper-inverter type;
   b. Output means adapted for connection with a load means;

c. A filter section connected between said input and output means, said filter section including a series inductance formed by an intermediate-tapped winding having magnetically coupled winding portions separated by an intermediate tap point; and
   d. A shunt rectifier device connected to said intermediate-tap point across said output means and one of said winding portions and being poled to block current flow from said source so that during the ON-time of said voltage source energy is supplied to said output mans and stored in said magnetic circuit at one voltage and current value with the shunt rectifier device in its current blocking condition and during the OFF-time of said voltage source said shunt rectifier is rendered conductive and circulates said stored energy through said load means and the winding portion between the intermediate tap point and the output means at a lower voltage and higher current value whereby the instantaneous current demand from the voltage source is kept below the current requirements of the load means, there being a greater number of turns in the winding portion between said input means and said intermediate tap point than in the winding portion between said intermediate tap point and said output means.

2. The four-terminal network recited in claim 1 wherein said rectifier device is a semiconductor diode.

3. A four-terminal network comprising:
   a. Input means adapted to be connected with an ON-OFF type voltage source of the chopper-inverter type;
   b. Output means adapted for connection with a load means;
   c. A filter section connected between said input and output means, said filter section including a series inductance formed by an intermediate-tapped winding having magnetically coupled winding portions separated by an intermediate tap point; and
   d. A shunt rectifier device connected to said intermediate-tap point across said output means and one of said winding portions and being poled to block current flow from said source so that during the ON-time of said voltage source energy is supplied to said output means and stored in said magnetic circuit at one voltage and current value with the shunt rectifier device in its current blocking condition and during the OFF-time. of said voltage source said shunt rectifier is rendered conductive and circulates said stored energy through said load means and the winding portion between the intermediate tap point and the output means at a lower voltage and higher current value whereby the instantaneous current demand from the voltage source is kept below the current requirements of the load means, there being a greater number of turns in the winding portion between said input means and said intermediate tap point than in the winding portion between said intermediate tap point and said output means, said rectifier device is a semiconductor diode, said magnetic circuit including a laminated iron core having an air gap that is sufficient to prevent the DC magnetization from saturating the core.

4. The four-terminal network recited in claim 3 further including a shunt capacitor connected across the output means.

* * * * *